US012154208B2

(12) United States Patent
Baker et al.

(10) Patent No.: US 12,154,208 B2
(45) Date of Patent: Nov. 26, 2024

(54) METHOD AND SYSTEM OF DECOUPLED OBJECT SPACE SHADING

(71) Applicant: Oxide Interactive, Inc., Timonium, MD (US)

(72) Inventors: Daniel Kurt Baker, Towson, MD (US); Timothy James Kipp, Fallston, MD (US); Nathan Heazlett, Cantonsville, MD (US); Gregory Osefo, Pikesville, MD (US)

(73) Assignee: Oxide Interactive, Inc., Timonium, MD (US)

( * ) Notice: Subject to any disclaimer, the term of this patent is extended or adjusted under 35 U.S.C. 154(b) by 0 days.

(21) Appl. No.: 17/726,693

(22) Filed: Apr. 22, 2022

(65) Prior Publication Data

US 2022/0245883 A1 Aug. 4, 2022

Related U.S. Application Data

(62) Division of application No. 17/073,193, filed on Oct. 16, 2020, now Pat. No. 11,436,783.

(60) Provisional application No. 62/916,048, filed on Oct. 16, 2019.

(51) Int. Cl.
*G06T 15/00* (2011.01)
*G06T 17/20* (2006.01)

(52) U.S. Cl.
CPC ............ *G06T 15/005* (2013.01); *G06T 17/20* (2013.01)

(58) Field of Classification Search
CPC ........ G06T 15/005; G06T 17/20; G06T 19/20
See application file for complete search history.

(56) References Cited

U.S. PATENT DOCUMENTS

| 5,793,374 | A | 8/1998 | Guenter |
| 6,353,437 | B1 | 3/2002 | Gagne |
| 6,441,816 | B1 | 8/2002 | Nguyen |
| 7,170,515 | B1 | 1/2007 | Zhu |
| 8,228,337 | B1 | 7/2012 | Khodakovsky |
| 8,395,629 | B1 | 3/2013 | Kilpatrick |

(Continued)

OTHER PUBLICATIONS

Cook et al., "The Reyes Image Rendering Architecture," ACM Computer Graphics, 21(4):95-102; Jul. 1987 (8 pages).

(Continued)

*Primary Examiner* — Michelle Chin
(74) *Attorney, Agent, or Firm* — Ice Miller LLP; Thomas J. Clare (57) ABSTRACT

A method for generating a graphic display of frame images comprises collecting one or more graphic objects to be rendered into a frame image, the one or more graphic objects being represented as a mesh in object space; determining one or more shadels to be computed for the frame image based at least on the one or more input attributes for each of the one or more graphic objects, each shadel being a shaded portion of the mesh; allocating space in a shadel storage buffer for the one or more shadels; populating a work queue buffer, the work queue buffer containing a list of commands to be executed to compute each of the one or more shadels; computing the determined one or more shadels to generate a shaded mesh; and rasterizing the shaded mesh into the frame image. The method can be implemented using a graphics processing unit (GPU).

25 Claims, 7 Drawing Sheets

(56) References Cited

U.S. PATENT DOCUMENTS

| | | |
|---|---|---|
| 8,508,550 B1 | 8/2013 | Jenny |
| 8,638,331 B1 | 1/2014 | Jarosz |
| 10,269,167 B1* | 4/2019 | Imbrogno ............... G06T 1/60 |
| 2003/0001838 A1 | 1/2003 | Han |
| 2003/0117403 A1 | 6/2003 | Park |
| 2004/0001069 A1 | 1/2004 | Snyder |
| 2004/0012600 A1 | 1/2004 | Deering |
| 2004/0012603 A1 | 1/2004 | Pfister |
| 2005/0174346 A1 | 8/2005 | Park |
| 2005/0206657 A1 | 9/2005 | Arcas |
| 2006/0028469 A1 | 2/2006 | Engel |
| 2007/0002066 A1 | 1/2007 | Whitted |
| 2007/0024620 A1 | 2/2007 | Muller-Fischer |
| 2007/0097123 A1 | 5/2007 | Loop |
| 2007/0216676 A1 | 9/2007 | Lee |
| 2007/0252841 A1 | 11/2007 | Kim |
| 2008/0074415 A1 | 3/2008 | Woo |
| 2008/0074430 A1 | 3/2008 | Jiao |
| 2008/0238919 A1 | 10/2008 | Pack |
| 2008/0238942 A1 | 10/2008 | Sun |
| 2009/0189897 A1 | 7/2009 | Abbas |
| 2009/0256845 A1 | 10/2009 | Sevastianov |
| 2010/0085360 A1 | 4/2010 | Ren |
| 2010/0188404 A1 | 7/2010 | Tong |
| 2011/0080519 A1 | 4/2011 | Chowdry |
| 2011/0090224 A1 | 4/2011 | Woo |
| 2011/0102437 A1 | 5/2011 | Akenine |
| 2011/0102440 A1 | 5/2011 | Yuen |
| 2011/0115802 A1 | 5/2011 | Mantor |
| 2011/0148919 A1 | 6/2011 | Heggelund |
| 2011/0242119 A1 | 10/2011 | Bolz |
| 2011/0285736 A1 | 11/2011 | Kilgard |
| 2011/0285747 A1 | 11/2011 | Kilgard |
| 2012/0092366 A1 | 4/2012 | Smithers |
| 2012/0147007 A1 | 6/2012 | Woo |
| 2012/0229445 A1 | 9/2012 | Jenkins |
| 2012/0281004 A1* | 11/2012 | Shebanow ............... G09G 5/36 345/557 |
| 2012/0313944 A1 | 12/2012 | Kontakanen |
| 2013/0155103 A1 | 6/2013 | Kakarlapudi |
| 2013/0235053 A1 | 9/2013 | Bourd |
| 2013/0247054 A1* | 9/2013 | Schmit ............... G06F 9/546 718/102 |
| 2013/0265309 A1 | 10/2013 | Goel |
| 2013/0271465 A1 | 10/2013 | Clarberg |
| 2013/0318051 A1* | 11/2013 | Kumar ............... G06F 16/137 707/692 |
| 2013/0328857 A1 | 12/2013 | Burley |
| 2013/0342547 A1 | 12/2013 | Lum |
| 2014/0002458 A1 | 1/2014 | Angelidis |
| 2014/0063016 A1 | 3/2014 | Howson |
| 2014/0112536 A1 | 4/2014 | Ely |
| 2014/0132613 A1 | 5/2014 | Lassen |
| 2014/0168220 A1 | 6/2014 | Nystad |
| 2014/0176549 A1 | 6/2014 | Uralsky |
| 2014/0327684 A1 | 11/2014 | Engh-Halstvedt |
| 2014/0354637 A1 | 12/2014 | Reiner |
| 2015/0022537 A1 | 1/2015 | Lum |
| 2015/0070355 A1 | 3/2015 | Clarberg |
| 2015/0130805 A1 | 5/2015 | Baker |
| 2015/0262413 A1 | 9/2015 | Baker |
| 2015/0317827 A1 | 11/2015 | Crassin |
| 2017/0116699 A1* | 4/2017 | Hakura ............... G06T 11/40 |
| 2018/0114290 A1 | 4/2018 | Paltashev |
| 2019/0035140 A1* | 1/2019 | Fricke ............... G06T 15/506 |
| 2019/0355163 A1* | 11/2019 | Imbrogno ............... G06F 9/54 |

OTHER PUBLICATIONS

Pfister et al., "Surfels: Surface Elements as Rendering Primitives," ACM Proceedings of the 27th Annual Conference on Computer Graphics and Interactive Techniques, pp. 335-342; 2000 (8 pages).

Burns et al., "A Lazy Object-Space Shading Architecture with Decoupled Sampling," Conference on High Performance Graphics, pp. 19-28; 2010 (10 pages).

Sabino et al., "A Hybrid GPU Rasterized and Ray Traced Rendering Pipeline for Real Time Rendering of per Pixel Effects," International Conference on Entertainment Computing, pp. 292-305; 2012 (14 pages).

* cited by examiner

METHOD AND SYSTEM OF DECOUPLED OBJECT SPACE SHADING

RELATED APPLICATIONS

This application is a divisional of pending U.S. patent application Ser. No. 17/073,193, filed Oct. 16, 2020, which claims priority under 35 U.S.C. § 119 to U.S. Provisional Application No. 62/916,048, entitled "Method and System of Decoupled Object Space Shading," and filed on Oct. 16, 2019. The contents of both applications are hereby incorporated by reference herein in their entireties.

TECHNICAL FIELD

Aspects of the present disclosure relate generally to rendering graphics, and more particularly, to a method of generating a graphic display of frame images that includes executing a raster loop and a shade loop.

BACKGROUND

With increased hardware processing capability, sophisticated video graphics are increasingly possible in applications such as video streaming or video gaming. In a typical hardware system that supports graphics, applications are executed by a conventional central processing unit (CPU), which may require calls for rendering graphic objects on a display. In order to efficiently process the display of such graphics, specialized processors termed graphic processing units (GPU) have been employed to render graphics. A GPU is a specialized processing circuit designed to rapidly manipulate and alter memory to accelerate the creation of images in a frame buffer intended for output to a display. Typical GPUs perform various graphic processing functions by performing calculations related to 3D graphics. These include accelerating memory-intensive work such as texture mapping and rendering polygons, and performing geometric calculations such as the rotation and translation of vertices into different coordinate systems. GPUs may also support programmable shaders, which can manipulate vertices and textures, oversampling and interpolation techniques to reduce aliasing, and provide very high-precision color spaces.

Currently, applications such as state-of-the-art video games require high resolution and detailed graphics presented in real-time. In real-time graphics, shading is a method of taking a desired graphic object, which is usually a collection of triangles formed from vertices and textures, then rendering the object onto an image by assigning shading to the triangles of the object, resulting in a colored image for a video frame. Most video games perform shading by employing either forward rendering or deferred rendering methods.

In forward rendering, each object is drawn one by one. The triangles of the objects are processed and then drawn onto the screen in the order they were submitted. For each pixel element of the triangle, a pixel program (or fragment program) is executed, which evaluates the color for that pixel on the screen. The image created is an approximate color value of what will be presented to the user, resembling in format and style a computer representation of a photograph.

In deferred rendering, rather than each object rendering a color into an image, shading parameters are rendered into a deep image that is a series of images that may contain more data than just a color. Shading parameters might include factors such as a normal direction, an albedo color, or a specular color and power. Once the deep image is created, another series of shader programs operates on the deep image and transforms it into an image. This approach decouples shading from rasterization, shading the final image buffer based on the shading parameters.

Both of these known approaches have drawbacks. Forward rendering may make local shading evaluation more computationally expensive, since small localized effects might need to be applied to large areas of a scene. Deferred renders are notorious for the ability to have a limited number of materials and suffer intrinsic limitations in regards to anti-aliasing. Both approaches also suffer from shader aliasing. Shader aliasing renders artifacts (mistakes) made because the shader program has logic that can alias. Thus, there is a need for improved systems and methods for perform graphics processing.

SUMMARY

In one aspect of the present disclosure, a method for generating a graphic display of frame images comprises collecting, via a graphics processing unit (GPU), one or more graphic objects to be rendered into a frame image, the one or more graphic objects being represented as a mesh in object space; determining, via the GPU, one or more shadels to be computed for the frame image based at least on the one or more input attributes for each of the one or more graphic objects, each shadel being a shaded portion of the mesh; allocating, via the GPU, space in a shadel storage buffer for the one or more shadels; populating, via the GPU, a work queue buffer, the work queue buffer containing a list of commands to be executed to compute each of the one or more shadels; computing, via the GPU, the determined one or more shadels to generate a shaded mesh; and rasterizing, via the GPU, the shaded mesh into the frame image.

In one aspect of the present disclosure, a method for generating a graphic display of frame images comprises continuously executing a raster loop at a first frequency, the raster loop collecting meshes representing graphic objects to be rendered into frame images and rasterizing the meshes into the frame images; and continuously executing a shade loop at a second frequency, the shade loop generating shaded portions of the meshes and storing the shaded portions of the meshes in a shadel storage buffer. In response to the raster loop determining that a shaded portion of a respective mesh is stored in the shadel storage buffer, the raster loop is configured to (i) read the shaded portion of the respective mesh from the shadel storage buffer and (ii) rasterize the respective mesh into a respective frame image. In response to the raster loop determining that the shaded portion of the respective mesh is not stored in the shadel storage buffer, the raster loop is configured to (i) generate the shaded portion of the respective mesh, (ii) store the shaded portion of the respective mesh in a shadel miss buffer, (iii) read the shaded portion of the respective mesh from the shadel miss buffer, and (iv) rasterize the respective mesh into the respective frame image.

In one aspect of the present disclosure, a graphics rendering system for generating a graphic display of frame images comprises a memory storing one or more graphic objects to be rendered into a frame image; and a graphics rendering engine. The graphics rendering engine is operable to collect the one or more graphic objects to be rendered into a frame image, the one or more graphic objects being represented as a mesh in object space; determine, via the GPU, one or more shadels to be computed for the frame image based at least on the one or more input attributes for each of the one or more graphic objects, each shadel being a shaded portion of the mesh; allocate, via the GPU, space in a shadel storage buffer for the one or more shadels; populate, via the GPU, a work queue buffer, the work queue buffer containing a list of commands to be executed to compute each of the one or more shadels; compute, via the GPU, the determined one or more shadels to generate a shaded mesh; and rasterize, via the GPU, the shaded mesh into the frame image.

In one aspect of the present disclosure, a graphics rendering system for generating a graphic display of frame images comprises a memory storing one or more graphic objects to be rendered into a frame image; and a graphics rendering engine. The graphics rendering engine is operable to continuously execute a raster loop at a first frequency, the raster loop collecting meshes representing the one or more graphic objects to be rendered into frame images and rasterizing the meshes into the frame images; and continuously execute a shade loop at a second frequency, the shade loop generating shaded portions of the meshes and storing the shaded portions of the meshes in a shadel storage buffer. In response to the graphics rendering engine determining that a shaded portion of a respective mesh is stored in the shadel storage buffer, the graphics rendering engine is further operable to (i) read the shaded portion of the respective mesh from the shadel storage buffer and (ii) rasterize the respective mesh into a respective frame image. In response to the graphics rendering engine determining that the shaded portion of the respective mesh is not stored in the shadel storage buffer, the graphics rendering engine is further operable to (i) generate the shaded portion of the respective mesh, (ii) store the shaded portion of the respective mesh in a shadel miss buffer, (iii) read the shaded portion of the respective mesh from the shadel miss buffer, and (iv) rasterize the respective mesh into the respective frame image.

In one aspect of the present disclosure, a system for generating a graphic display of frame images comprises a memory storing one or more graphic objects to be rendered into a frame image; and one or more processing units coupled to the memory. At least one of the one or more processing units is operable to collect the one or more graphic objects to be rendered into a frame image, the one or more graphic objects being represented as a mesh in object space; determine, via the GPU, one or more shadels to be computed for the frame image based at least on the one or more input attributes for each of the one or more graphic objects, each shadel being a shaded portion of the mesh; allocate, via the GPU, space in a shadel storage buffer for the one or more shadels; populate, via the GPU, a work queue buffer, the work queue buffer containing a list of commands to be executed to compute each of the one or more shadels; compute, via the GPU, the determined one or more shadels to generate a shaded mesh; and rasterize, via the GPU, the shaded mesh into the frame image.

In one aspect of the present disclosure, a system for generating a graphic display of frame images comprises a memory storing one or more graphic objects to be rendered into a frame image; and one or more processing units coupled to the memory. At least one of the one or more processing units is operable to continuously execute a raster loop at a first frequency, the raster loop collecting meshes representing the one or more graphic objects to be rendered into frame images and rasterizing the meshes into the frame images; and continuously execute a shade loop at a second frequency, the shade loop generating shaded portions of the meshes and storing the shaded portions of the meshes in a shadel storage buffer. In response to the graphics rendering engine determining that a shaded portion of a respective mesh is stored in the shadel storage buffer, the graphics rendering engine is further operable to (i) read the shaded portion of the respective mesh from the shadel storage buffer and (ii) rasterize the respective mesh into a respective frame image. In response to the graphics rendering engine determining that the shaded portion of the respective mesh is not stored in the shadel storage buffer, the graphics rendering engine is further operable to (i) generate the shaded portion of the respective mesh, (ii) store the shaded portion of the respective mesh in a shadel miss buffer, (iii) read the shaded portion of the respective mesh from the shadel miss buffer, and (iv) rasterize the respective mesh into the respective frame image.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Disclosed herein is a generalized decoupled shading system. This system includes a layer material system, a dynamic hierarchical sparse, shade space allocation system, a GPU shade work dispatcher, a miss-shade dispatch resolver, and a multi-frame shade work distribution system. Together, these new systems create a generalized solution to decoupled shading, solving both the visibility problem, where shading samples which are not visible are shaded, the overshading and under shading problem, where parts of the scene are shaded at higher or lower number of samples then is needed, and the shade allocation problem, where shade samples must be efficiently stored in GPU memory. The generalized decoupled shading system generally shades and stores only the samples which are actually needed for the rendering a frame, with minimal overshading and undershading. The shading and rendering can generally be done with minimal overhead.

Figure 1:
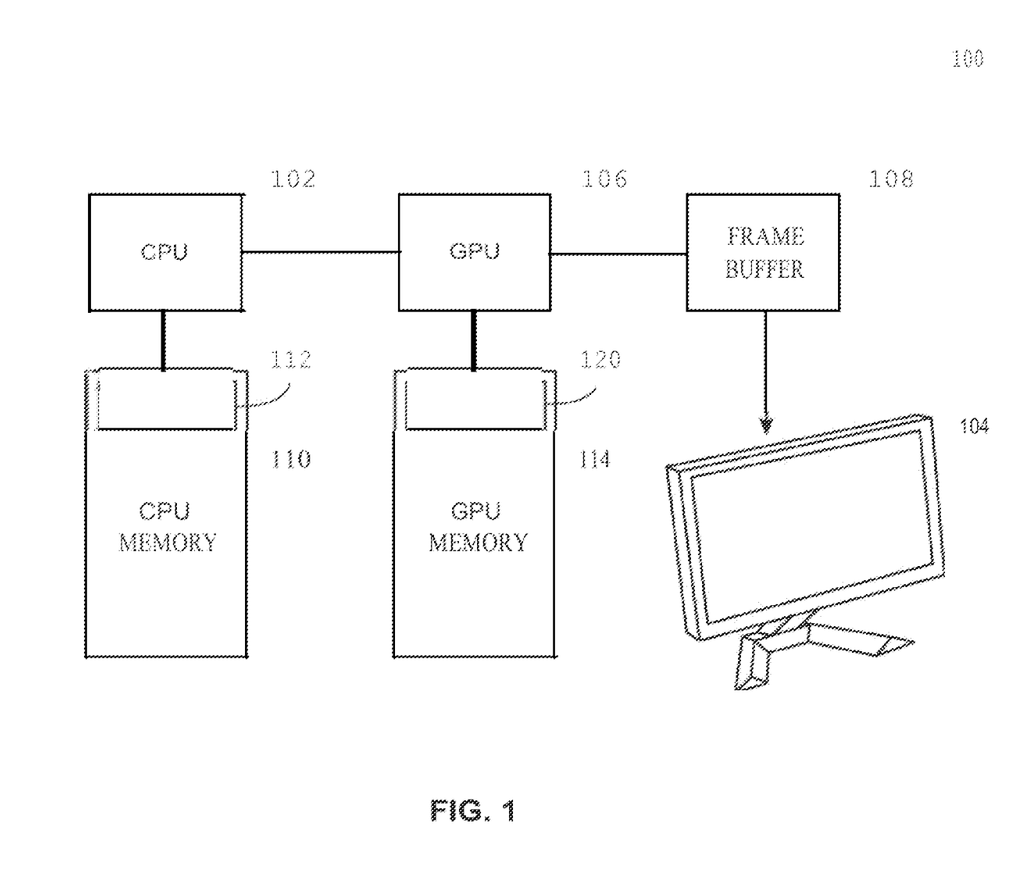
FIG. 1 is an example graphics-based processing system to implement a shading system.

FIG. 1 shows an example graphic-based processing system 100 to implement the shading system. The system 100 that includes a game engine executing on a central processing unit (CPU) 102. As is generally understood, the game engine calls graphics that are displayed on a display 104. The graphics of the game engine are processed by a graphic processing unit (GPU) 106 and rendered in scenes stored on a frame buffer 108 that is coupled to the display 104. Although, the example in FIG. 1 is directed toward video gaming systems, it is to be understood that the principles explained herein are applicable to any application requiring real-time or high-speed graphics processing. The CPU 102 has an associated CPU memory 110 and the GPU 106 has an associated video or GPU memory 114. Although shown as a separate element in FIG. 1, the frame buffer 108 may be an allocated area of the video memory 114. It is to be understood that the CPU 102 and GPU 106 may each include multiple processing cores. Alternatively, additional CPUs or GPUs may be used in the system 100 for parallel processing of the graphic processing operations described below.

As will be explained below, the GPU 106 renders graphic objects on the display 104 in response to requests by the CPU 102, which executes an example game engine 112 stored on the CPU memory 110. The GPU 106 is coupled to the GPU or video memory 114. The GPU 106 executes a graphics rendering engine 120 stored on the GPU memory 114. Most two-dimensional (2D) or three-dimensional (3D) graphic objects created for real-time rendering is created in the form of a mesh in object space. These graphic objects in object space are not visible to the viewer on a display, but rather are geometric representations of the graphic objects that contain a variety of different attributes. The mesh is a collection of primitives (e.g., shapes, which can include triangles and/or other shapes) joined at shared vertices. These primitives contain information related to various attributes, includes, normal, position, texture coordinates, specular power, albedo, etc. Based on the two-dimensional image that is to be displayed on the display 104 (e.g., the frame image), the mesh can be shaded based on the attributes of the various graphic objects. The shaded mesh can then be rasterized into the frame image.

According to aspects of the present disclosure, the graphics-based processing system 100 can be used to determine and compute shadels. Shadels are shade elements of the mesh, and thus form portions of the shaded mesh. In some implementations, the shadels are stored as squares. In other implementations, the shadels can be stored as other shapes, such as triangles, parallelograms, or n-gons. By determining and computing the shadels based on the various attributes of the graphic objects, the shaded mesh can then be generated from the shadels, and then rasterized into the frame image. The shadels thus determine the color of each pixel in the frame image.

Figure 2:
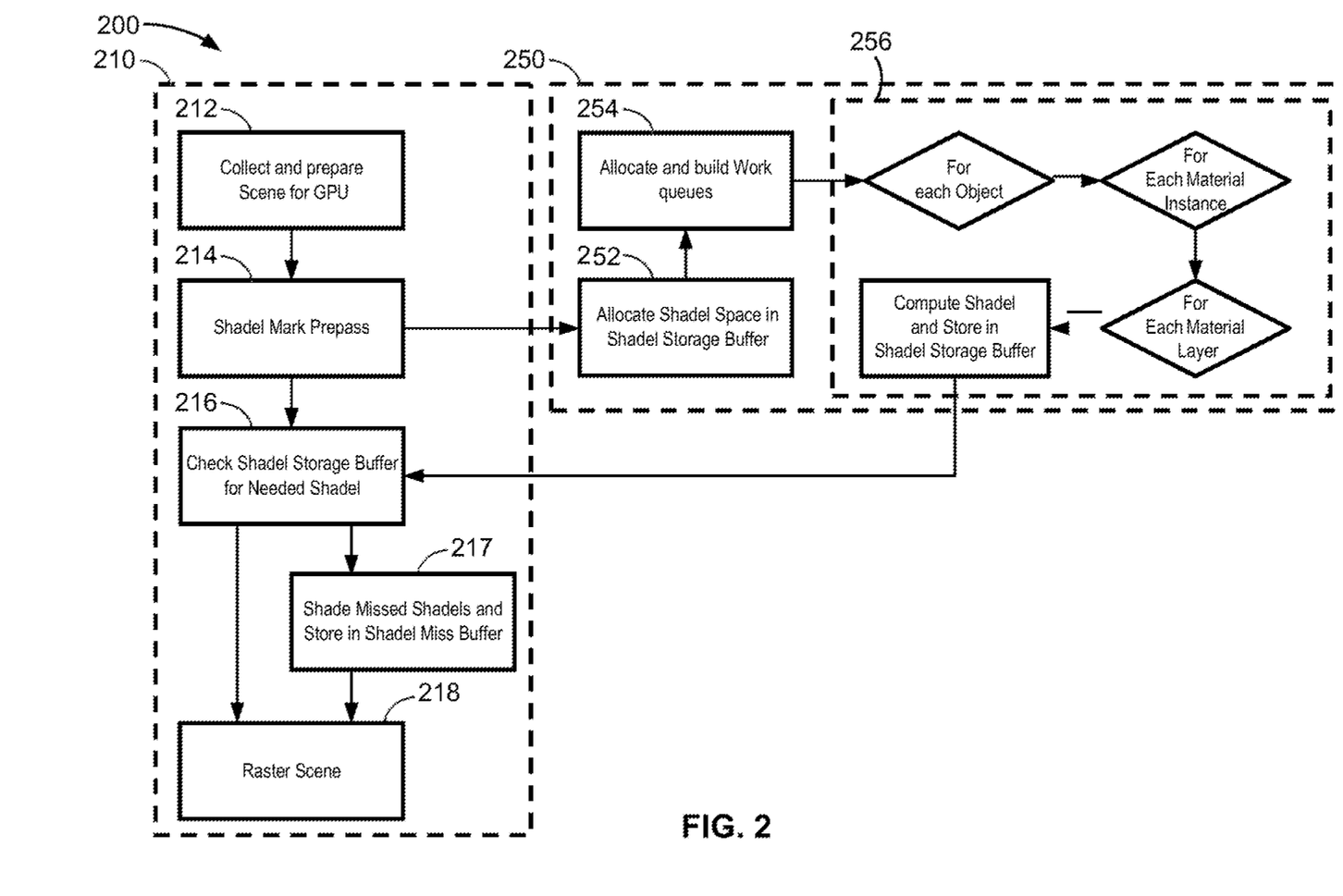
FIG. 2 is a flowchart of a process for performing rasterizing and shading operations.

FIG. 2 shows a flowchart of a process 200 for performing rasterizing and shading operations, in order to render the frame image. The steps of the process 200 can be performed, for example, by components of the graphic-based processing system 100, including the CPU 102 and the GPU 106. The process 200 includes two separate components, a raster loop 210 and a shade loop 250.

Step 212 of the raster loop 210 includes collecting and preparing a scene for the GPU 106. This step generally includes collecting all information that is relevant to what is to be displayed on the display within a given frame image. Generally, this information will include attributes of various different 2D and 3D objects existing within the scene. The 2D and 3D objects can include characters (e.g., humans, animals, etc.), non-living objects (e.g., items held or interacted with by the characters such as weapons, chairs, etc.), environmental objects (e.g., trees, rocks, etc.), structures (such as buildings), or any other suitable object. The attributes can include normal, position, texture coordinates, specular power, albedo, triangle index, anisotropy angle, material mask, bone weights, bone indices, and others. The information can also include any other information that might be relevant to the scene, such as relative positions of characters/items/structures, environmental conditions (day, night, cloudy, rainy, sunny, etc.), and other information. The various steps of the process 200 utilize all of these attributes to render 2D frame image. What is actually displayed as part of the frame image is affected by these attributes. For example, only parts of characters or other object may be visible due to the relative positions of the objects (e.g., one character blocking part of another character from the perspective of the view), environmental conditions (e.g., only part of character being visible due to shadow cast by building and sun), etc.

Step 214 of the raster loop 210 includes performing a shadel mark prepass to determine which shadels need to be computed for the frame image, based on the various attributes of the scene and the graphic objects in the scene. As discussed in more detail herein, the shadel mark prepass in step 214 of the raster loop 210 generally includes performing a proxy rendering of the frame image. Step 216 of the raster loop 210 includes retrieving computed shadels from a shadel storage buffer that are needed to rasterize into the frame image. The shadel storage buffer can be an allocated area of any memory of system 100. In some implementation, raster loop 210 can include step 217 that computes needed shadels that have not yet been computed by the shade loop 250. Finally, step 218 of the raster loop 210 rasterizes the computed shadels into the frame image.

The shade loop 250 performs most of the operations necessary to compute and store the shadels needed to rasterize into the frame image. Step 252 of the shade loop 250 includes allocating space for the shadels in a shadel storage buffer. As shown in FIG. 2, the shade loop 250 receives information about the shadels needed for a specific frame image from the shadel mark prepass operation performed at step 214 of the raster loop 210. This information is then used to allocate space in the shadel storage buffer for the shadels. Step 254 of the shade loop 250 includes allocating space in a work queue buffer, and then populating the allocated space in the work queue buffer. Once the space for the shadels is allocated in the shadel storage buffer and the system 100 knows which shadels need to be processed, the actual commands executed by the GPU 106 need to be generated. These commands are generated at step 254, and then storage in the work queue buffer. Finally, step 256 includes computing the required shadels and storing the computed shadels in the shadel storage buffer. As shown in FIG. 2, shadels can be required for each graphic object in the scene, for each material instance of each graphic object in the scene (e.g., the same graphic object might appear multiple times in the scene), and for each material layer within the scene.

Figure 3:
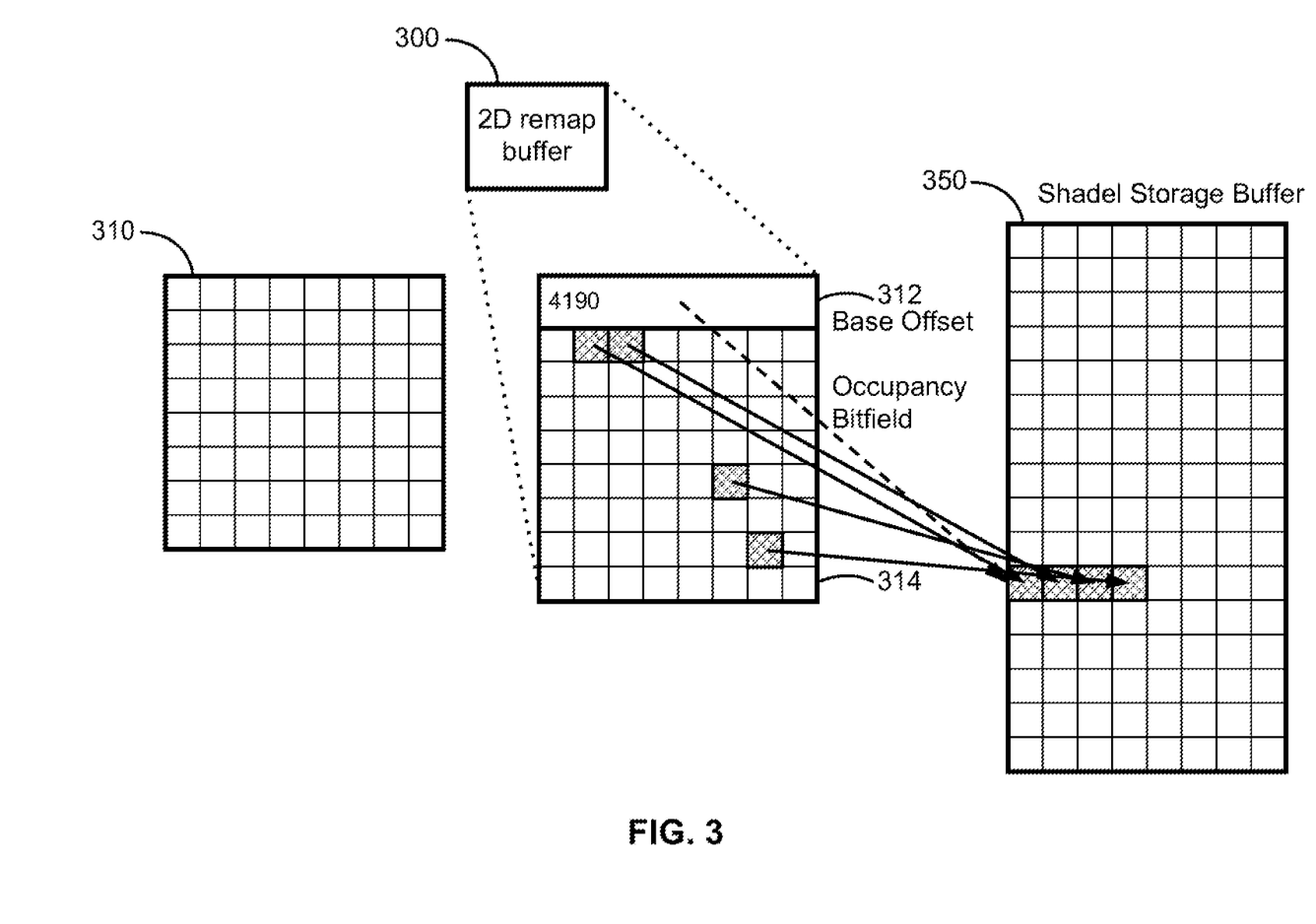
FIG. 3 is a virtualized shadel space system for storing shadels.

FIG. 3 shows a virtualized shadel space system 300 that includes a 2D remap buffer 310 and a shadel storage buffer 350. When objects (e.g., graphic objects) are instantiated and could possibly render into the frame image (but may not be actually requested to render for a particular frame), the objects are allocated shade space inside the virtualized shadel space system 300. Shadels are distinct from both texels and pixels, because they could be implemented in a variety of ways depending on the specific hardware being used. On some platforms, for example, it might be more efficient to store shadels in a typeless buffer rather than a texture.

The virtualized shadel space system 300 is formed as a virtualized 2D space. The virtualized 2D space can generally have any 2D dimensions, including up 512K×512 k. Each graphic object is allocated with the maximum possible shadel density which could be needed for any sub-section of the object, including detail which might be introduced via a material shade. The virtualized 2D space generally has enough space such that graphic objects that are instantiated in the scene need not bound their maximum scale other than a very course maximum. In some implementations, the set of shadels needed occupies a small portion of the virtualized 2D space The virtualized 2D space is created as a two-level hierarchy, but can be implemented in such a way as to require only one level of dependent reads. The shadels themselves are stored in 2D blocks, which can be implemented as 8×8 groups of shadels. The 2D remap buffer 310 and the shadel storage buffer 350 can be allocated areas of any memories in system 100, and can be implemented as two 2D textures. The 2D remap buffer 310 and the shadel storage buffer 350 can generally be implemented in any resource of the GPU 106, such as unordered access view (UAV) buffers.

Each entry in the 2D remap buffer 310 contains three values: a 32 bit shadel block start offset 312 which marks the begin index location of a group of shadels in the shadel storage buffer 350; the object instance ID which represents which object the group shadels belong to; and an occupancy bitfield 314, which is a 64-bit value. Each bit in the occupancy bitfield 314 indicates whether a specific shadel of the group of shadels is occupied or not occupied. Thus, each entry in the 2D remap buffer represents an 8×8 group of shadels. If the group of shadels is also an 8×8 group of shadels, then each entry in the 2D remap buffer 310 represents 64×64 contiguous shadels. In other implementations however, the shadels can be grouped in different manners.

To address a particular shadel, the 2D shadel location is indexed to the 2D remap buffer 310 which corresponds to it, and a sub-index of the shadel group is also calculated. The sub-index will correspond to one of the 64 bits in the 2D remap buffer 310. The address of the shadel group is then calculated by the following formula: ShadelGroupStartIndex+countbits(~(ShadelSubIndex−1) & OccupancyField). This gives the location of the shadel group, where each shadel can easily be sub-indexed. The shadel allocation ID number provides an index value which will be used for the dispatching of work by the GPU.

In some implementations, an additional level of indirection can be used. In these implementations, a secondary remap buffer can be used with a similar allocation step. This configuration introduces an additional dependent texture read, but increases practical virtualized shade space dimensions to the 4M×4M range at a small decrease in performance. It is possible to use virtual resident textures to map pages in/out as necessary which should allow these same resolutions with no additional passes and minimal additional overhead.

The shadel storage buffer 350 can have a level of detail similar to a MIP map in a texture. However, even though the 2D remap buffer 310 may be stored in a 2D texture, the MIP hardware and texture addressing capabilities are not used. This is due to UAV mapping challenges and alignment requirements which require specific rules for MIP block alignment. Specifically, because a shadel group is set to 8×8, and each entry the 2D remap buffer 310 therefore corresponds to 64 shadels, single allocations smaller than 64 shadels can't be made in the shade space, even for smaller MIP levels.

Figure 4:
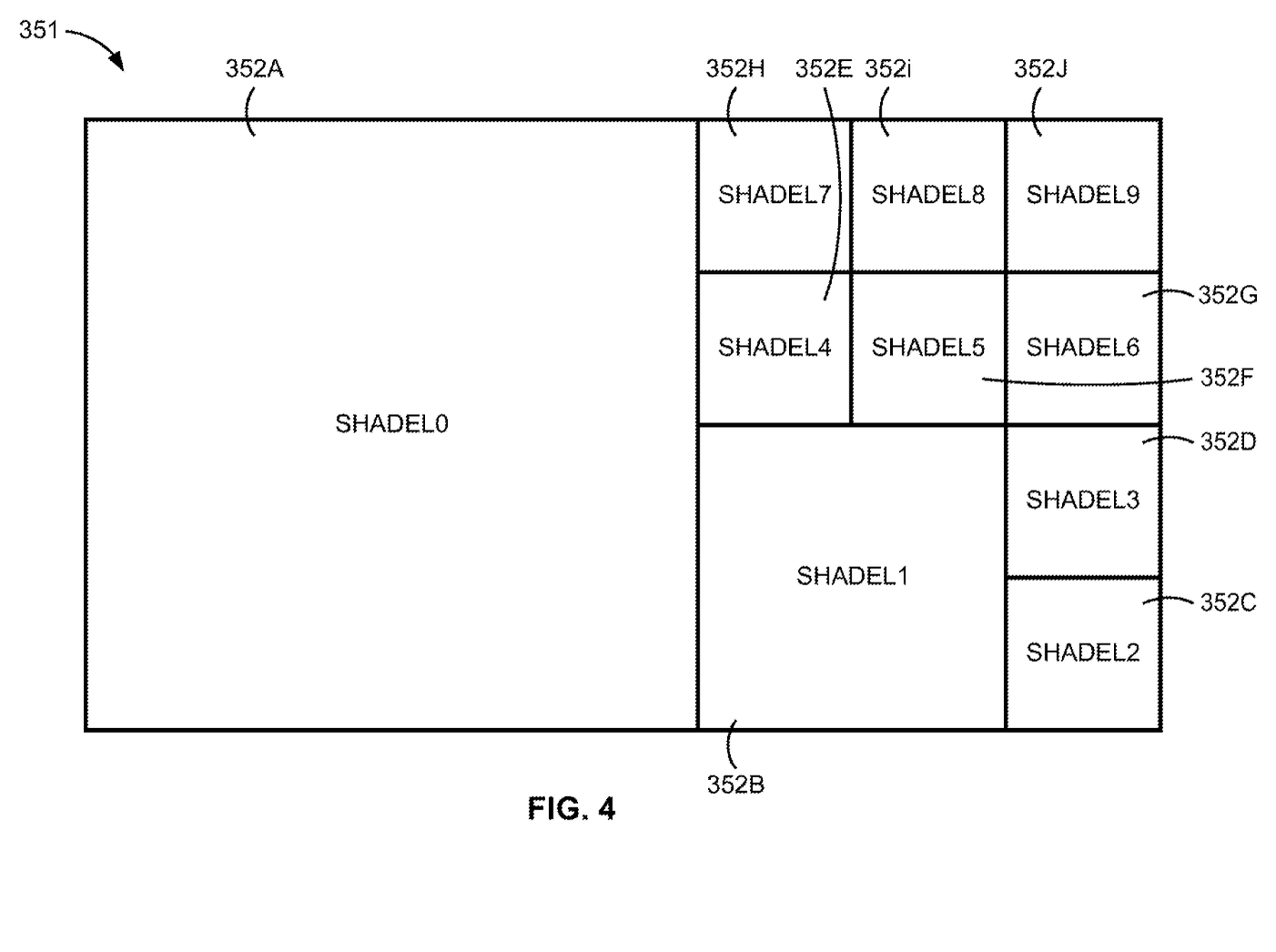
FIG. 4 is a map showing details levels for a shadel or a group of shadels.

FIG. 4 shows the detail levels for a shadel 351 (or a group 351 of shadels) in the shadel storage buffer 350. As shown, the group of shadels contain multiple details levels 352A-352J. Each detail level 352A-352J is labeled as SHADEL0, SHADEL1, . . . , SHADEL9. Level 352A occupies the largest amount of space in the shadel storage buffer 350. Level 352B occupies a smaller amount of space in the shadel storage buffer 350. Levels 352C-352J each occupy generally the same amount of space in the shadel storage buffer 350, which is smaller than the space for both level 352A and level 352B. Thus, the group of shadels in the shadel storage buffer 352B is similar to a MIP map, as it includes a series of details sets at lower resolutions.

In the illustrated implementation, the smallest group of shadels for which space is allocated in the shadel storage buffer 350 is a group of 256 shadels. Thus, the amount of space for details levels 352C-352J can generally be the same, as these lower detail levels would all align to the same size. In this implementation, some of the occupancy bits can never be set on the edges of the lower detail levels, and some entries in the 2D remap buffer 310 are never written to or read from. However, in other implementations, larger or smaller groups of shadels can be allocated, and thus the details levels 352A-352J can be various different sizes.

Referring to step 214 of the raster loop 210, the shadel mark pre-pass is performed to determine which shadels are needed, e.g., which portions of the meshes forming the graphic objects in the scene will need to be shaded for the 2D frame image. To implement the shadel mark pre-pass, the hardware of the system 100 can perform a proxy rendering of the frame image that executes the shader stages of the rasterization hardware of the GPU 106.

Figure 5:
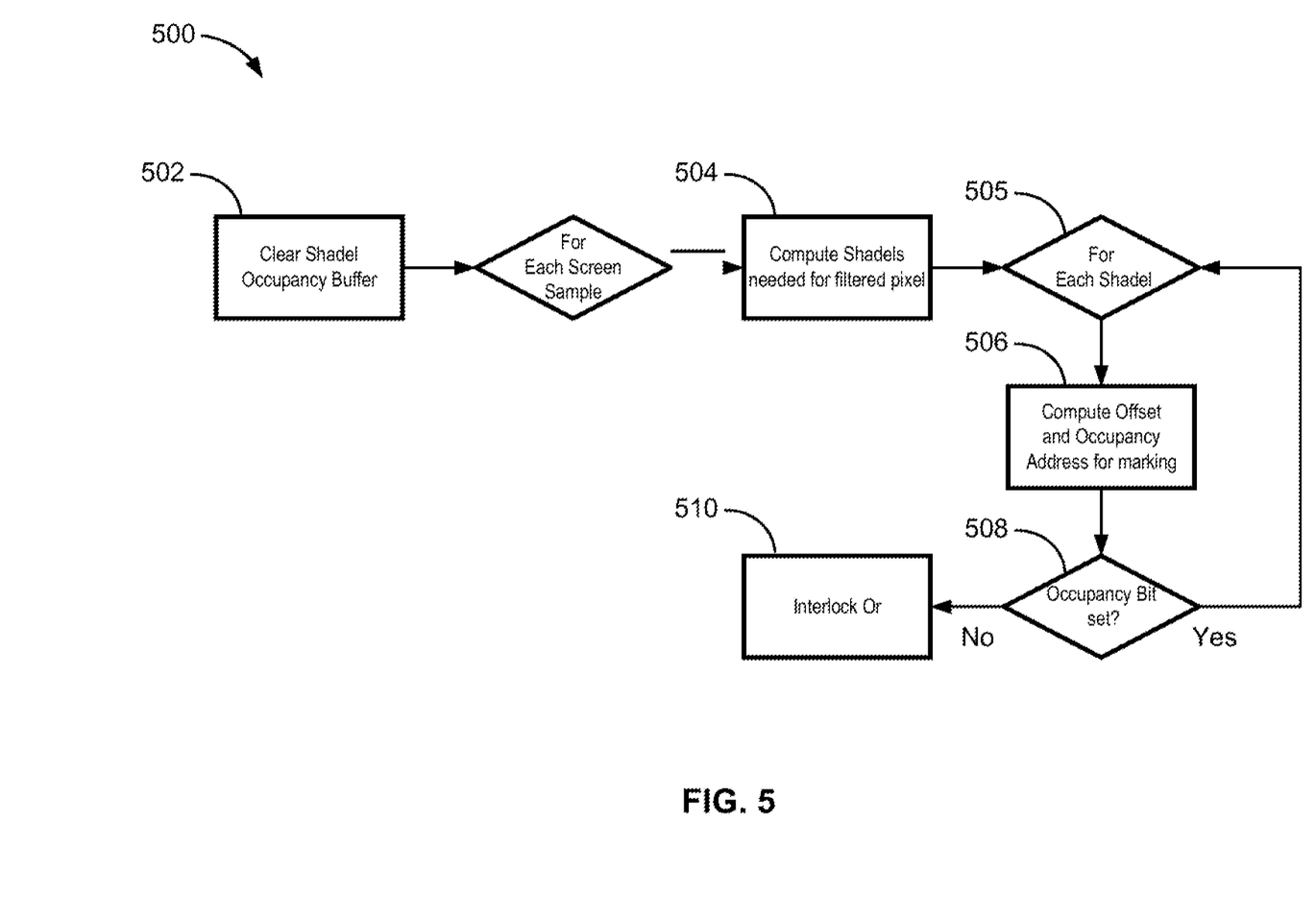
FIG. 5 is a flowchart for a process of performing a shadel mark pre-pass.

FIG. 5 shows a flowchart of the process 500 for performing the shadel mark pre-pass. The 2D remap buffer 310 allows for the shadels to by physical mapped. Before this occurs however, system 100 performs the shadel mark-prepass to mark the actual shadels that are needed. Step 502 includes clearing all bits from the occupancy bitfield 314 of the 2D remap buffer 310. If a texture is used for the 2D remap buffer 310, this clearing process is essentially free on the GPU 106.

Step 504 of the process 500 includes identifying which shadels will need to be computed for each image frame. Step 504 can include performing a proxy render of the scene using rasterization hardware. In some implementations, the shader stages of the rasterization hardware that render the objects on the screen are used. These shader stages can include any type of shader, such as a vertex shader, a hull shader, a domain shader, a mesh shader, and others.

In some implementations, to perform the proxy render, a pixel shader is used similar as to how it would be used to perform a simple object rasterization. For each pixel in the frame image, a mapping operation is performed to identify a group of shadels that are needed to determine the color of the pixel in the frame image. This step thus includes determining which discrete units of the mesh that will need to be shaded. To perform the mapping, a filter can be implemented, such as a bilinear filter or a trilinear filter. In some implementations, the filter can be implemented manually. During the shadel mark prepass, the actual shadels are not be loaded, but rather all of the shadels needed to compute the color of each pixel are marked.

At step 506, once it is determined which shadels will be needed, the location of the occupancy bits in the 2D remap buffer 310 for the needed shadels is computed. As described above, each group of shadels allocated in the virtualized shadel space system 300 has an occupancy bit which corresponds to it. Thus, for all shadels needed for a pixel, the occupancy bits corresponding to those shadels need to be set.

Step 508 includes determining whether each occupancy bit needs to be set (e.g., set to high). Step 510 includes setting the required bits. As shown at step 505, steps 506, 508, and 510 are performed for each shadel. Because all bits were initialized to 0, step 510 only needs to be performed if the bit actually needs to be set. In some implementations, the occupancy bits are set using an "interlocked or" function. By only performing this function on the required bits, a significant performance increase can be achieved, since the bitfields are so small as to usually be in the L1 or L2 cache on the GPU. Generally, most pixels are processed in the same unit as other nearby pixels. Thus, write combiners in the GPU 106 can be used such that the actual amount of writes to the memory are on the order of only two to four bits per shadel group. If the shadel group size is 8×8, a display screen with a 4K resolution writes only about 1 MB of actual data. In some implementations, an early depth stencil pixel shader attribute is used to allow the GPU 106 to very early exit work on shadels which will not be visible in the frame image. By using this attribute, only shadels which will actually end up contributing to the scene will be marked.

Figure 6:
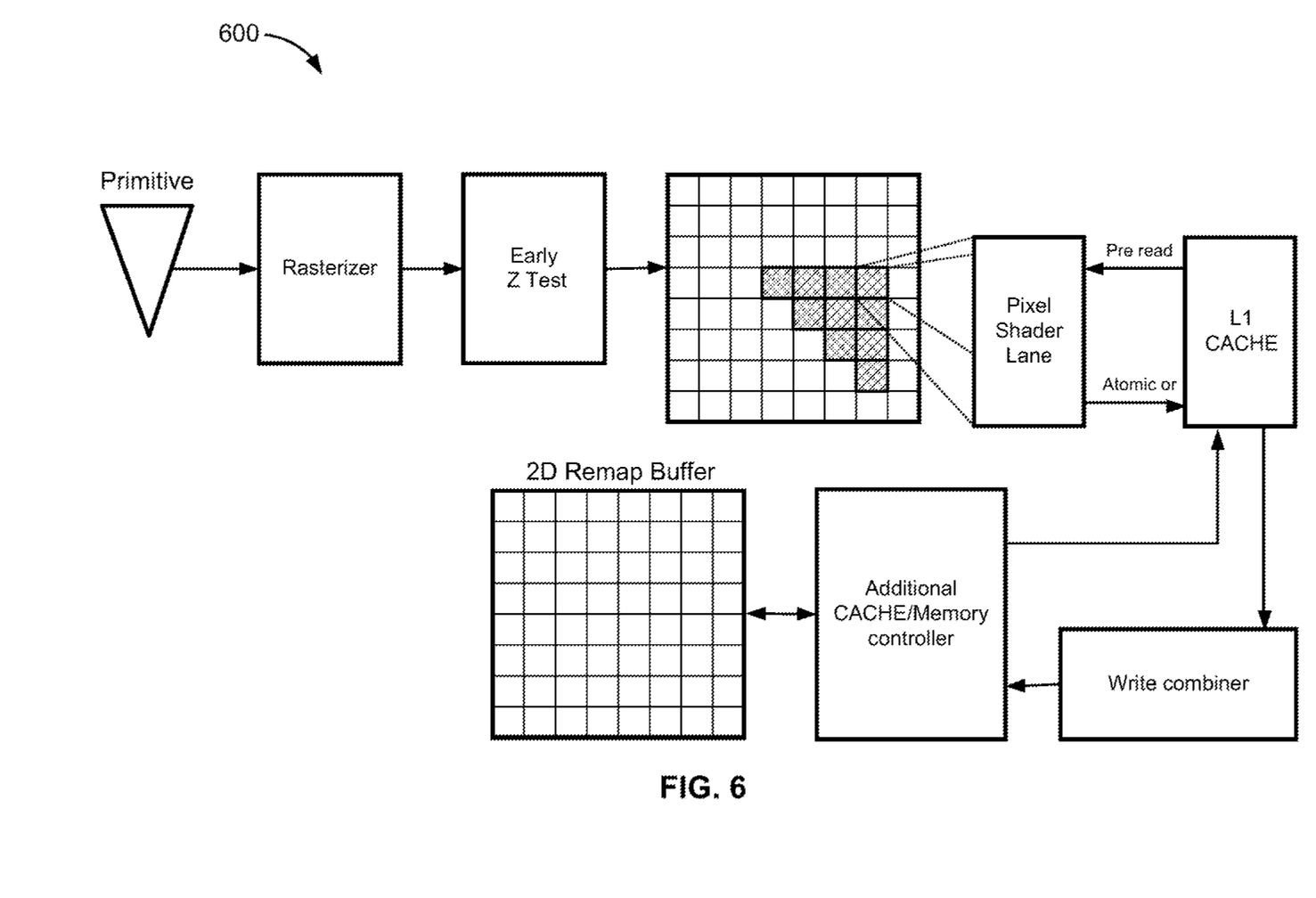
FIG. 6 is a configuration of a GPU for marking shadels during the shadel mark pre-pass.

FIG. 6 illustrates a configuration 600 of a GPU (such as GPU 106) can be configured to mark the needed shadels. This configuration includes fixed function rasterization, early z depth tester, pixel shader lanes (executing a pixel shader), write combiners, atomic operations, and efficient caches. These hardware units are generally part of the GPU, which can thus effectively be repurposed the GPU to make the pixel shader efficient at marking the shadels with a small number of prepasses of the scene. The number of prepasses of the scene performed with the hardware of FIG. 6 to mark the shadels according to process 500 can be one, between one and five, between one and ten, or between one and twenty.

Referring back to FIG. 2, once the shadel mark prepass has been performed at step 214 of the raster loop 210, the shade loop 250 executes to compute the marked shadels. At step 252 of the shade loop, space for the shadels in the shadel storage buffer 350 is allocated. This process is performed by examining and iterating each bitfield which corresponds up to 64 groups of shadels. The number of shadels needed for that group is the number of bits set in the bitfield. To allocate the space in the shadel storage buffer 350, the shadel storage buffer 350 is subdivided into N subdivisions. The spaces for the shadels are then be allocated in parallel by performing an atomic exchange increment on one of the subdivisions by using any number of simple hash functions to map a shadel group to a subdivision. Thus, each shadel is assigned to a respective one of the N subdivisions. The actual location of an individual shadel is computed by examining the set bits of the 2D remap buffer 310. Although this requires slightly more reading of data for addressing, it generally reduces the operation to only one dependent read and the remap locations small size means they are typically inside the L1 cache of the GPU.

Step 254 of the shade loop includes populating a work queue buffer with the list of commands to be executed to compute each of the shadels. The 2D remap buffer 310 is examined, and the list of commands is generated for each object that will need to be rendered. The work list consists of the virtual remap location of each shadel chunk and the associated shadel detail level. The work queue buffer is shared among all objects. Because the work queue buffer is allocated into segments depending on how many work items are needed for each object, each work item is effectively a shadel group. Some objects are not visible at all, due to occlusion, frustum or other conditions which might mean that their shadels are not touched. These objects will have a work count of zero, and take no space in the work queue buffer. When the work queue buffer is populated, a work dispatch parameter buffer is also populated with the start location of the work queue to read, and the number of items which will require shading. Each entry in the work dispatch parameter buffer is referenced via a dispatch indirect call, which corresponds to all the state required for the shading and processing of shadels for a particular object—with one indirect dispatch per material layer per object.

Finally, step 256 includes executing the commands in the work queue buffer to compute each required shadel for the frame image. Computing the shadels takes into account all of the various attributes of the graphic objects in the scenes, and the computed shadels are the shaded portions of the meshes representing the various graphic objects. In some implementations, the number of shadels that are computed for each frame image is at least twice as large as the number of pixels in the frame image. Step 256 first includes performing a layer shade space support expander. Generally, the graphic objects can be formed as layered materials. Material layers exist as a series of layer images, with a layer program executing on each layer image. Each layer image is evaluated before the next layer can process, and layers can read and write from arbitrary previous layers. Layers can be useful for any operation which requires neighborhood information. For example, a height map can be converted into a normal map by a material creating a height map in one layer, and then computing a normal from that layer by processing the heights.

To support layers, the same location is used to correspond and to address multiple image layer planes, which can store these possible intermediate image layers. However, because a layer may need support for a kernel operation (e.g. a wider neighborhood to compute a normal), this can create problems where these shadels were never evaluated because the shadel of that location would never be used for the final composition in this scene.

To support such scenarios, each layer of the object can specify the amount of support it requires. A normal map may require two extra shadels on each side, for example. This is supported by marking neighborhood shadels which fall within the support range as being touched by performing a post process on the shade remap buffer. Each material region is compared against its support requirements the appropriate neighborhood bits are marked. This is somewhat similar to a very simple flood fill. Once the layers are expanded, the required shadels are computed and stored in the shadel storage buffer 350. Step 256 is performed for each layer of each material instance of each graphic object.

At step 216 of the raster loop 210, the shadel storage buffer 350 is checked to find the shadel needed to raster the scene into the frame image. At step 218, the scene is rastered into the frame image. Rasterization occurs in a similar process as the shadel mark prepass. However, during rasterization, instead of marking the shadels that will be used, the shadels are ready from the shadel storage buffer 350 using the already-populated 2D remap buffer 310.

Generally, system 100 can implemented the raster loop 210 and the shade loop 250 in an immediate mode or an indirect mode. In the immediate mode, all of the shadels that are marked during the shadel mark prepass are processed by the time the raster loop 210 rasters the scene into the frame image at step 218. In the immediate mode, the raster loop 210 and the shade loop 250 are executed at generally the same frequency/frame rate.

However, in the indirect mode, the dispatches to compute the shadels are deferred and processed asynchronously. The shadels can be processed in an alternate queue, processed over many frames, or even transmitted across a network and processed remotely. In the indirect mode, a second shadel storage buffer is used in addition to the shadel storage buffer 350. This buffer is referred to as a shadel miss buffer. If at step 216 of the raster loop 210, it is determined that certain required shadels are not storage in the shadel storage buffer 350, step 217 of the raster loop 210 is performed. At step 217, the missed shadels are computed and stored them in the shadel miss buffer. Step 218 of the raster loop 210 then rasters the scene into the frame image based on the computed shadels in the shadel storage buffer 350, and the computed shadels in the shadel miss buffer. In the indirect mode, the raster loop 210 and the shade loop 250 are generally executed at different frequencies/frame rates. However, in some implementations, the raster loop 210 and the shade loop 250 are executed at the same frequency/frame rate when operated in indirect mode.

The shadel miss buffer generally guarantees that any suddenly visible object or part of object will have the shadels require to render. The shadel miss buffer and indirect shadel processing are only required if the application requires air-tight rendering. For some applications, such as very high frame rate or VR applications where objects which are suddenly on screen may not be very visible to users, this step can be disabled, or disabled by the user for very low end systems where performance is desirable to some missed shades.

In the indirect mode, any object inside the shadel miss buffer are computed with the same set of shading constants and values that were used for the current shadels. Otherwise, tearing and other artifacts could occur because some shadels would be using different shading inputs. To mitigate this problem, the shader and material parameters that were used in the generation of the shadels are cached, and can be used to computed the missed shadels. This cache is known as the shadel material parameter cache. In some implementations, the raster loop 210 and the shade loop 250 run at generally the same resolution, which ensures water-tightness. However, in some implementations, if layer edge expansion is enabled, the shadel mark prepass can be run at a lower resolution without noticeable issues.

Thus, the graphic objects are represented as meshes in object space, and the shadels are shaded portions of the meshes that represent the graphic objects. Computing the shadels generates one or more shaded meshes (or portions of one or more shaded meshes). The shaded meshes are then rasterized into the frame image. Overall, the raster loop 210 is continuously executed at a first frequency to collect meshes representing graphic objects to be rendered into frame images, identify needed shadels (e.g., needed portions of the meshes to shade), and rasterize the shadels (e.g., the shaded portions of the meshes) into the frame images. The shade loop 250 is continuously executed at a second frequency to compute the identified shadels, and store the shadels in the shadel storage buffer. When the raster loop 210 determines that certain shadels are stored in the shadel storage buffer, the raster loop 210 reads the shadels from the shadel storage buffer, and rasterizes the shadels into the frame image. When the raster loop 210 determines that certain shadels are not stored in the shadel storage buffer, the raster loop 210 generates the missing shadels and stores them in a shadel miss buffer, and when needed, reads those shadels from the shadel miss buffer and rasterizes them into the frame image. The first frequency and the second frequency can be the same or different. These methods can be implemented by any suitable graphic rendering system that is operable to generate a graphic display of frame images. The graphic rendering system can include one or more memory devices and a graphics rendering engine, which can be implemented by one or more processing units and/or devices (e.g., any combinations of CPUs, GPUs, and other processors).

Generally, a typical scene results in a large number of shadels to be computed. For many scenes, the number of shadels that need to be computed is at least twice as many pixels in the resulting image frame, to result in a sufficient amount of shade coverage. In some cases, the number of shadels required can exceed the space in the shadel storage buffer 350. To mitigate this problem, the current number of shadels is continuously uploaded to the CPU 102. As this number approaches a given threshold, the system 100 can increase a global MIP bias value, which reduces the amount of space in the shadel storage buffer 350 needed for a given shadel. The global MW bias value can fractionally adjust itself to keep the required amount of storage for the needed shadels within the usable space in the shadel storage buffer 350. In one implementation, if the resolution of the frame image is 1920×1080, a back buffer is about 16 MB, and the total shadel memory is 50 MB for the 2D remap buffer 310, and 64 MB for the shadel storage buffer 350. In another implementation, if the resolution of the frame image is 2560×1600, a back buffer is about 32 MB, and the total shadel memory is 50 MB for the 2D remap buffer 310, and 128 MB for the shadel storage buffer 350. In a further implementation, if the resolution of the frame image is 3840×2160, a back buffer is about 64 MB, and the total shadel memory is 50 MB for the 2D remap buffer 310, and 256 MB for the shadel storage buffer 350.

Figure 7:
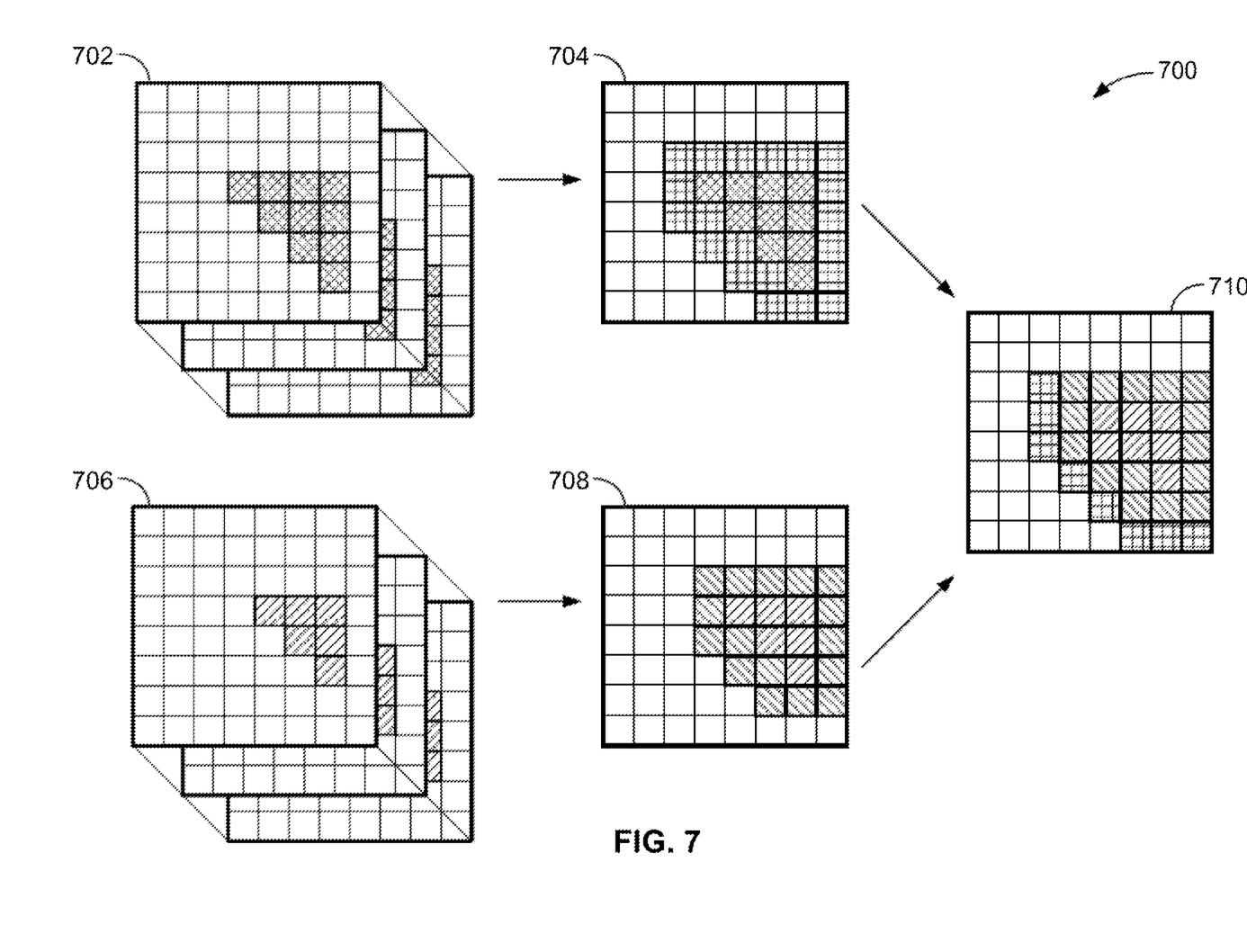
FIG. 7 is a flowchart of a process for collecting attributes for a scene to be rendered.

FIG. 7 illustrates a process for collecting attributes for the scene to be rendered. Generally, the meshes representing the graphic objects are triangulated meshes. Thus, these meshes can be converted into shadel input attributes. FIG. 7 shows a flowchart of the process 700 for capturing the attributes. Process 700 involves rendering the model from the 2D texture parameter space into a buffer, thereby capturing the rendered attributes, either repeating this process for each shadel level (analogous to a MIP level), or performing a downsampling filter.

At step 702, a standard render is performed to capture the attributes and the derivatives of each attribute (using the hardware ddx and ddy instructions). At step 704, the buffer is flood filled by using the derivatives to compute the adjacent (unrendered) attributes. This fills the attribute buffer with shadel attributes which can be used to provide support to operations which require neighborhood information, and mathematically would give the same derivative in the shadel version as would have been calculated during rasterization. This process is repeated for each detail level.

Sometimes, however, triangle or section of triangles on the mesh can result in no attributes being captured, due to triangles falling in between coverages rules for rasterization. This can later result in geometry being rendered and having no shadels which represent it. To solve this, process 700 also performs a conservative render to capture the attributes and the derivatives of each attribute, at step 706. Step 706 is generally the same as step 702, but with a conservative render, which changes the coverage rule such that all triangles will emit an attribute to any shadel they touch. At step 708, the buffer is flood filled with derivatives in a manner similar to step 704. Finally, at step 710, the two attribute captures are merged. The non-conservative rasterization is preferred, however if a sample exists in the conservative rasterization where no sample exists in the non-conservative version, the merged version uses the conservative rasterization sample. This process means that there is no chance that a triangle when applied to rasterization, does not have any captured attributes, and because the derivatives were also captured and used as flood fill, any shading which occurs on the sample will have well defined derivatives.

In some implementations, the above shading techniques can be integrated with ray tracing hardware. To ray trace inside a material, the scene is also updated and maintained in one or more bounding volume hierarchies (BVH), as is typical for ray tracing in real time. At this point, any shadel can request a ray trace in the same manner as a pixel shader could, allowing full integration with ray tracing. However, ray tracing can be integrated more deeply into the shading system described herein. If various surface properties are collected into different layers, then traced rays can look up their values into the populated shadel remap and storage buffer, marking the shadels in the remap buffer so that they become available in future frames. The shading technique disclosed herein allows for additional modes of operation. Rather than trace rays directly in the material, the rays start location and s can be stored into one or more layers. This layer is then dispatched to ray tracing hardware which populates another layer with the results of the ray trace shader. By dispatching large clusters of rays at once, the decoupled shading engine can sort and group the rays for a much faster trace through the scene, avoiding costly shading during the hit shaders.

Each of these embodiments and obvious variations thereof is contemplated as falling within the spirit and scope of the claimed invention, which is set forth in the following claims.

What is claimed is:

1. A method for generating a graphic display of frame images, the method comprising:
   collecting, via a graphics processing unit (GPU), one or more graphic objects to be rendered into a frame image, the one or more graphic objects being represented as a mesh in object space;
   determining, via the GPU in a raster loop at a first frequency, one or more shadels to be computed for the frame image based at least on the one or more input attributes for each of the one or more graphic objects, each shadel being a shaded portion of the mesh;
   allocating, via the GPU in a shade loop at a second frequency, space in a shadel storage buffer for the one or more shadels by subdividing the shadel storage buffer into a plurality of subdivisions;
   performing atomic exchange increments on respective ones of the plurality of subdivisions, wherein the atomic exchange increments are performed in parallel using GPU hardware atomic operations, and wherein the atomic exchange increments are performed using hash functions to map the one or more shadels to the respective ones of the plurality of subdivisions;
   populating, via the GPU, a work queue buffer, the work queue buffer containing a list of commands to be executed to compute each of the one or more shadels;
   computing, via the GPU, the determined one or more shadels to generate a shaded mesh; and
   rasterizing, via the GPU, the shaded mesh into the frame image.

2. The method of claim 1, wherein the determining the one or more shadels to be computed includes performing a proxy render of the frame image.

3. The method of claim 2, wherein performing the proxy render of the frame image comprises:
   clearing a bitfield element of a shadel remap buffer;
   for each pixel in the frame image, performing a mapping operation to identify a group of shadels needed to determine a color of the pixel in the frame image;
   computing a location of a respective occupancy bit for each group of shadels in 2D remap buffer; and
   setting the respective occupancy bit for each group of shadels.

4. The method of claim 3, wherein the mapping operation includes manually implementing a trilinear filter or a bilinear filter.

5. The method of claim 3, wherein each group of shadels needed to determine the color of the pixels in the frame image includes one or more shadels.

6. The method of claim 2, wherein the proxy render of the frame image is performed using pixel shader hardware.

7. The method of claim 1, wherein a number of shadels to be computed for the frame image is at least twice as large as a number of pixels in the frame image.

8. The method of claim 1, wherein populating the work queue buffer includes:
   generating a work list for each of the one or more shadels, the work list for each respective shadel including a location of the respective shadel in the shadel storage buffer and a level of detail of the respective shadel; and
   populating a work dispatch parameter buffer with a start location of the work list for each of the one or more shadels and with a number of items to be shaded.

9. A graphics rendering system for generating a graphic display of frame images, the system comprising:
   a memory storing one or more graphic objects to be rendered into a frame image; and
   a graphics rendering engine operable to:
      collect the one or more graphic objects to be rendered into a frame image, the one or more graphic objects being represented as a mesh in object space;
      determine, via the GPU in a raster loop at a first frequency, one or more shadels to be computed for the frame image based at least on the one or more input attributes for each of the one or more graphic objects, each shadel being a shaded portion of the mesh;
      allocate, via the GPU in a shade loop at a second frequency, space in a shadel storage buffer for the one or more shadels by subdividing the shadel storage buffer into a plurality of subdivisions;

perform atomic exchange increments on respective ones of the plurality of subdivisions, wherein the atomic exchange increments are performed in parallel using GPU hardware atomic operations, and wherein the atomic exchange increments are performed using hash functions to map the one or more shadels to the respective ones of the plurality of subdivisions;

populate, via the GPU, a work queue buffer, the work queue buffer containing a list of commands to be executed to compute each of the one or more shadels;

compute, via the GPU, the determined one or more shadels to generate a shaded mesh; and rasterize, via the GPU, the shaded mesh into the frame image.

10. The system of claim 9, wherein to determine the one or more shadels to be computed, the graphics rendering engine is operable to perform a proxy render of the frame image.

11. The system of claim 10, wherein to perform the proxy render of the frame image, the graphics rendering engine is operable to:

clear a bitfield element of a shadel remap buffer;

for each pixel in the frame image, perform a mapping operation to identify a group of shadels needed to determine a color of the pixel in the frame image;

compute a location of a respective occupancy bit for each group of shadels in 2D remap buffer; and set the respective occupancy bit for each group of shadels.

12. The system of claim 11, wherein the mapping operation includes manually implementing a trilinear filter or a bilinear filter.

13. The system of claim 11, wherein each group of shadels needed to determine the color of the pixels in the frame image includes one or more shadels.

14. The system of claim 10, wherein the proxy render of the frame image is performed using pixel shader hardware.

15. The system of claim 9, wherein a number of shadels to be computed for the frame image is at least twice as large as a number of pixels in the frame image.

16. The system of claim 9, wherein to populate the work queue buffer, the graphics rendering engine is operable to:

generate a work list for each of the one or more shadels, the work list for each respective shadel including a location of the respective shadel in the shadel storage buffer and a level of detail of the respective shadel; and populate a work dispatch parameter buffer with a start location of the work list for each of the one or more shadels and with a number of items to be shaded.

17. The system of claim 9, further comprising a graphics processing unit (GPU) configured to execute the graphics rendering engine.

18. A system for generating a graphic display of frame images, the system comprising:

a memory storing one or more graphic objects to be rendered into a frame image; and one or more processing units coupled to the memory, at least one of the one or more processing units being operable to:

collect the one or more graphic objects to be rendered into a frame image, the one or more graphic objects being represented as a mesh in object space;

determine, via the GPU in a raster loop at a first frequency, one or more shadels to be computed for the frame image based at least on the one or more input attributes for each of the one or more graphic objects, each shadel being a shaded portion of the mesh;

allocate, via the GPU in a shade loop at a second frequency, space in a shadel storage buffer for the one or more shadels by subdividing the shadel storage buffer into a plurality of subdivisions;

perform atomic exchange increments on respective ones of the plurality of subdivisions, wherein the atomic exchange increments are performed in parallel using GPU hardware atomic operations, and wherein the atomic exchange increments are performed using hash functions to map the one or more shadels to the respective ones of the plurality of subdivisions;

populate, via the GPU, a work queue buffer, the work queue buffer containing a list of commands to be executed to compute each of the one or more shadels;

compute, via the GPU, the determined one or more shadels to generate a shaded mesh; and rasterize, via the GPU, the shaded mesh into the frame image.

19. The system of claim 18, wherein to determine the one or more shadels to be computed, the at least one of the one or more processing units is operable to perform a proxy render of the frame image.

20. The system of claim 19, wherein to perform the proxy render of the frame image, the at least one of the one or more processing units is operable to:

clear a bitfield element of a shadel remap buffer;

for each pixel in the frame image, perform a mapping operation to identify a group of shadels needed to determine a color of the pixel in the frame image;

compute a location of a respective occupancy bit for each group of shadels in 2D remap buffer; and set the respective occupancy bit for each group of shadels.

21. The system of claim 20, wherein the mapping operation includes manually implementing a trilinear filter or a bilinear filter.

22. The system of claim 20, wherein each group of shadels needed to determine the color of the pixels in the frame image includes one or more shadels.

23. The system of claim 19, wherein the proxy render of the frame image is performed using pixel shader hardware.

24. The system of claim 18, wherein a number of shadels to be computed for the frame image is at least twice as large as a number of pixels in the frame image.

25. The system of claim 18, wherein to populate the work queue buffer, the at least one of the one or more processing units is operable to:

generate a work list for each of the one or more shadels, the work list for each respective shadel including a location of the respective shadel in the shadel storage buffer and a level of detail of the respective shadel; and populate a work dispatch parameter buffer with a start location of the work list for each of the one or more shadels and with a number of items to be shaded.

* * * * *